United States Patent [19]
Lawrence et al.

[11] Patent Number: 5,574,126
[45] Date of Patent: Nov. 12, 1996

[54] ENERGETIC FLUORONITRO PREPOLYMER

[75] Inventors: G. William Lawrence, Silver Spring; William H. Gilligan, Ft. Washington, both of Md.

[73] Assignee: The United States of America as represented by the Secretary of the Navy, Washington, D.C.

[21] Appl. No.: 754,898

[22] Filed: May 23, 1985

[51] Int. Cl.$^6$ .................................................. C08G 18/44
[52] U.S. Cl. ............................ 528/66; 528/196; 528/271; 528/401; 149/88
[58] Field of Search ................................. 149/88; 528/66, 528/196, 271, 401

[56] References Cited

U.S. PATENT DOCUMENTS

| | | | |
|---|---|---|---|
| 3,306,939 | 2/1967 | Hill | 149/88 |
| 3,388,147 | 6/1968 | Kamlet et al. | 149/88 |
| 4,141,768 | 2/1979 | Lo et al. | 149/19.6 |
| 4,323,518 | 4/1982 | Gilligan | 149/88 |
| 4,411,837 | 10/1983 | Gilligan et al. | 149/88 |
| 4,449,000 | 5/1984 | Sitzmann et al. | 149/88 |
| 4,499,309 | 2/1985 | Sitzmann et al. | 149/88 |

*Primary Examiner*—Charles T. Jordan
*Assistant Examiner*—John R. Hardee
*Attorney, Agent, or Firm*—John Forrest; Roger D. Johnson

[57] ABSTRACT

Hydroxy-terminated poly(2-fluoro-2,2-dinitroethyl) polynitroorthocarbonate prepolymers of the formula

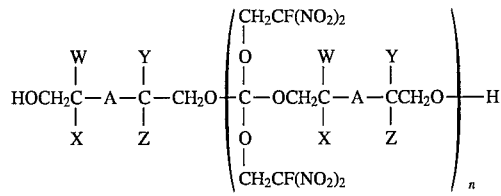

which are prepared by reacting bis(2-fluoro-2,2-dinitroethyl)dichloroformal with a diol of the formula

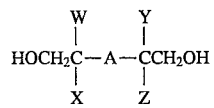

wherein n>1, and wherein W, X, Y, and Z vary independently and are F or $NO_2$, and wherein A is —$CH_2$—, —$CH_2CH_2$—, —$CH_2CH_2CH_2$—, —$CF_2$—, —$CF_2CF_2$—, —$CF_2CF_2CF_2$—, —$CF_2CF_2CF_2CF_2$—, —$CH_2OCH_2$—, —$CH_2OCH_2OCH_2$—, —$CH_2OCF_2OCH_2$—, or —$CH_2N(NO_2)CH_2$—. These prepolymers are reacted with curing agents (e.g., polyisocyanates) to form energetic polymeric binders.

6 Claims, No Drawings

ENERGETIC FLUORONITRO PREPOLYMER

BACKGROUND OF THE INVENTION

This invention relates to polymers and more particularly to energetic polymers which are useful as binders in propellants and explosives.

At the present time non-energetic binders are used for propellants and explosives. Energetic plasticizers are frequently combined with these binders to increase the energy. Unfortunately, the amounts of energetic plasticizer needed result in reductions in important properties such as tensile strength and elongation.

It would be desirable therefore to reduce the amounts of energetic plasticizers needed in explosive and propellant binders and thus improve physical properties such as tensile strength and elongation.

SUMMARY OF THE INVENTION

Accordingly, an object of this invention is to provide new polymers.

Another object of this invention is to provide new high energy polymers.

A further object of this invention is to provide polymers having a high concentration of stable, high energy 2-fluoro-2,2-dinitroethyl groups.

Yet another object of this invention is to provide means of increasing the energy content of binders without sacrificing tensile strength and elongation.

A still further object of this invention is to provide a new method of synthesizing energetic polymers.

These and other objects of this invention a achieved by providing hydroxy-terminated poly(2-fluoro-2,2-dinitroethyl) polynitroorthocarbonates prepolymers of the formula

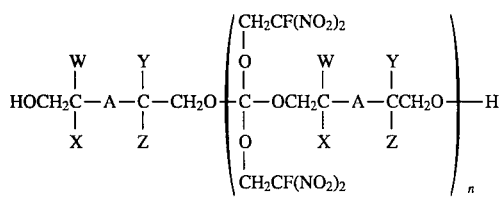

wherein n>1, and wherein W, X, Y, and Z vary independently and are F or $NO_2$, and —A—is —$CH_2$—, —$CH_2CH_2$—, —$CH_2CH_2CH_2$—, —$CF_2$—, —$CF_2CF_2$—, —$CF_2CF_2CF_2$—, —$CF_2CF_2CF_2CF_2$—, —$CH_2OCH_2$—, —$CH_2OCH_2OCH_2$—, —$CH_2OCF_2OCH_2$—, or —$CH_2N(NO_2)CH_2$—. These compounds are prepared by reacting bis(2-fluoro-2,2dinitroethyl)dichloroformal with a diol of the formula

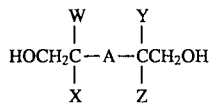

wherein W, X, Y, Z, and -A- are as defined above. These prepolymers react with polyisocyanates (functionality 2.0–3.0)to form energetic, rubbery polymeric binders.

DETAILED DESCRIPTION OF THE PREFERRED EMBODIMENT

The prepolymers of this invention are energetic hydroxy-terminated poly(2-fluoro-2,2-dinitroethyl) polynitroorthocarbonates prepolymers of the general formula

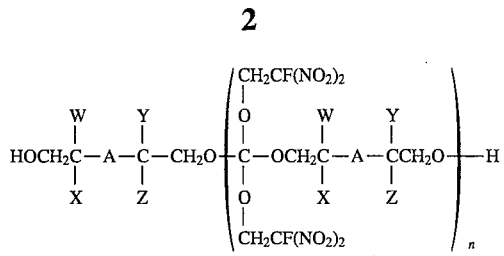

which are prepared by reacting bis(2-fluoro-2,2dinitroethyl)dichloroformal,

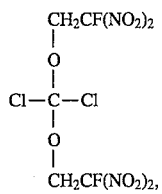

with a diol of the general formula

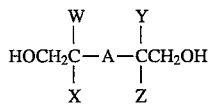

wherein n>1, and wherein W, X, Y, and Z vary independently and are each F or $NO_2$, and A represents a stable, nonreactive, preferably energetic linkage which will be described later. It is critical for the formation of stable poly(2-fluoro-2,2-dinitroethyl) polynitroorthocarbonates that W, X, Y, and Z each be a very strong electronegative fluoro or nitro group. In other words, the carbon atoms beta to the terminal hydroxy groups must each contain two of these strongly electronegative groups. Thus, the diols used in this invention will contain only —$CF_2CH_2OH$—, —$CF(NO_2)CH_2OH$—, and —$C(NO_2)_2CH_2OH$— end groups. Preferably the two end groups on the diol will be identical (W equal to Y and X equal to Z). The general formula for these preferred polyfluorodinitroethyl polynitroorthocarbonates is

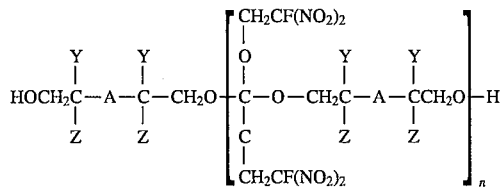

wherein n>1 and the general formula for the corresponding diol starting material is

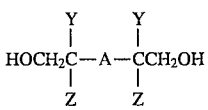

wherein Y and Z vary independently and are each F or $NO_2$.

As stated before, -A- may represent any one of a number of linkages provided that it is stable and is nonreactive under the conditions of the polymerization process. For example -A- may contain —$CH_2$—, —CHF—, —$CF_2$—, —$CH(NO_2)$—and —$C(NO_2)_2$units. —A— may also contain oxygen in the form of ether (e.g., —$CH_2OCH_2$—, —$CF_2OCF_2$—, etc.) or formals (e.g., —$CH_2OCH_2OCH_2$—, —$CH_2OCF_2OCH_2$—, etc.) units. However, unstable oxygen groups such as peroxides (—CH$_2$—O—O—CH$_2$—) are excluded. Oxygen in a reactive form such as —CH(OH)— is also excluded from —A—. Additionally, nitrogen may be present in the backbone of —A—. However, —NH— contains a reactive hydrogen and therefore is not desirable; on the other hand, —N(NO$_2$)— is stable, energetic, and nonreactive and therefore suitable.

Preferably, —A— can be —CH$_2$—, —CH$_2$CH$_2$—, —CH$_2$CH$_2$CH$_2$—, —CF$_2$—, —CF$_2$CF$_2$—, —CF$_2$CF$_2$CF$_2$—, —CF$_2$CF$_2$CF$_2$CF$_2$—, —CH$_2$OCH$_2$—, —CH$_2$OCH$_2$OCH$_2$—, —CH$_2$OCF$_2$OCH$_2$—, or —CH$_2$N(NO$_2$)CH$_2$—.

The following are examples of the diols which may be reacted with bis(2-fluoro-2,2-dinitroethyl)dichloroformal to form the hydroxy-terminated polyfluorodinitroethyl polynitroorthocarbonate prepolymers of this invention:

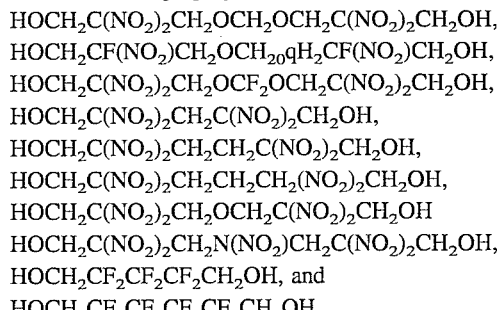

HOCH$_2$C(NO$_2$)$_2$CH$_2$OCH$_2$OCH$_2$C(NO$_2$)$_2$CH$_2$OH,

HOCH$_2$CF(NO$_2$)CH$_2$OCH$_{20}$qH$_2$CF(NO$_2$)CH$_2$OH,

HOCH$_2$C(NO$_2$)$_2$CH$_2$OCF$_2$OCH$_2$C(NO$_2$)$_2$CH$_2$OH,

HOCH$_2$C(NO$_2$)$_2$CH$_2$C(NO$_2$)$_2$CH$_2$OH,

HOCH$_2$C(NO$_2$)$_2$CH$_2$CH$_2$C(NO$_2$)$_2$CH$_2$OH,

HOCH$_2$C(NO$_2$)$_2$CH$_2$CH$_2$CH$_2$(NO$_2$)$_2$CH$_2$OH,

HOCH$_2$C(NO$_2$)$_2$CH$_2$OCH$_2$C(NO$_2$)$_2$CH$_2$OH

HOCH$_2$C(NO$_2$)$_2$CH$_2$N(NO$_2$)CH$_2$C(NO$_2$)$_2$CH$_2$OH,

HOCH$_2$CF$_2$CF$_2$CF$_2$CH$_2$OH, and

HOCH$_2$CF$_2$CF$_2$CF$_2$CF$_2$CH$_2$OH.

Note that long hydrocarbon chains, —(CH$_2$)n—, are undesirable because they substantially reduce the energy content of the polymer. On the other hand, polyfluorohydrocarbon and polynitrohydrocarbon chains are preferred because of their energy content.

Note that the -A- linkage in the diols is preferably a straight chain as this will produce a more flexible propellant binder.

Equimolar amounts of the diol and bis(2-fluoro-2,2-difluoroethyl)dichloroformal can be used, but preferably an excess of the diol is used to assure that the prepolymer product will be hydroxy-terminated. The molar ratio of diol to bis(2-fluoro-2,2-dinitroethyl)dichloroformal is from 1:1 to 2:1 and preferably from 1.33:1 to 1.50:1.

Preferably the average molecular weight of the hydroxy-terminated poly(2-fluoro-2,2-dinitroethyl) polynitroorthocarbonate prepolymer is from 1,000 to 10,000. As the molar ratio of diol to bis(2-fluoro-2,2dinitroethyl)dichloroformal is increased, the average molecular weight of the prepolymer produced decreases.

The polymerization reaction between a diol and the bis(2-fluoro-2,2-dinitroethyl)dichloroformal can be run without a solvent by melting the starting materials. However, it is safer and thus preferable to use a solvent. Preferred among the solvents are the chlorohydrocarbons such as methylene chloride, 1,2-dichloroethane, 1,1,1-trichloroethane, 1,1,2-trichloroethane, 1,1,2,2-tetrachloroethane, and chloroform, with chloroform being the preferred solvent. Nitromethane can also be used as the solvent.

The reaction temperature is preferably from about 50° C. to about 100° C. and more preferably from 60° C. to 65° C.

Preferably a rapid stream of nitrogen is passed through the reaction mixture to remove hydrogen chloride which is generated by the reaction between the diol and bis(2-fluoro-2,2-dinitroethyl)dichloroformal. It is advantageous to collect and titrate the evolved hydrogen chloride to determine and confirm the extent of reaction.

Crude poly(2-fluoro-2,2-dinitroethyl)polynitroorthocarbonate material is obtained either by solvent evaporation or by decantation of the supernatant liquid from the cooled reaction mixture. Purified material is obtained by extracting the low molecular weight impurities from the crude material with suitable solvents and/or solvent combinations. For example, a chloroform or a mixture of a few percent (~2%) of methanol in chloroform will work.

The purified hydroxy-terminated poly(2-fluoro-2,2dinitroethyl) polynitroorthocarbonate prepolymers can be reacted with suitable materials to produce energetic, plastic binders from explosives and propellants. For example, as illustrated by Examples 4 and 6, these prepolymers may be cured with polyisocyanates to produce rubbery polymers. Organic polyisocyanate which may be used in this invention include aromatic, aliphatic and cycloaliphatic diisocyanates, as for example: 2,4-toluene diisocyanate, 2,6-toluene diisocyanate, p-phenylene diisocyanate, 1,5-naphthylene diisocyanate, 4,4'-biphenylene diisocyanate, p,p'-methylene diphenyl diisocyanate, 1,4-tetramethylene diisocyanate, 1,6-hexamethylene diisocyanate, 1.10-decamethylene diisocyanate, 1,4-cyclohexylene diisocyanate, 4,4'-methylene-bis-cyclohexyl isocyanate), 1,5-tetrahydronaphthylene diisocyanate, and polymethylenepolyphenylisocyanate (PAPI), isophorone diisocyanate, and N,N'N"-trisisocyanatohexybiuret. Mixture of dissocyanates may also be used. Preferred polyisocyanates are 2,4-toluene diisocyanate, polymethylpolyphenylisocyanate (PAPI), and N,N'N"-trisisocyanatohexylbiuret. The polyisocyanate is used in an amount sufficient to supply from about 0.8:1 to about 1.5:1 but preferably from 1:1 to 1.2:1 isocyanate functional groups for each hydroxy functional group.

The general nature of the invention having been set forth, the following examples are presented as specific illustrations thereof. It will be understood that the invention is not limited to these examples but is susceptable to various modifications that will be recognized by one of ordinary skill in the art.

EXAMPLES

Examples 1 and 2 illustrate methods by which the bis(2-fluoro-2,2-dinitroethyl)dichloroformal starting material can be prepared. These examples are taken from U.S. patent application Ser. No. 256,462 which was filed on Mar. 30, 1981, by William H. Gilligan and which now is under a D-10 order.

Example 1

Bis(2-fluoro-2,2-dinitroethyl)dichloroformal

To a solution of 10.0g (28.6 mmol) of bis(2-fluoro-2, 2dinitroethyl) thionocarbonate in 50 ml of freshly distilled. sulfuryl chloride was added 4.0 ml of titanium tetrachloride. The solution was then refluxed for 5 days. Excess sulfuryl chloride and titanium tetrachloride were then removed in vacuo at a bath temperature of 50° C., The solid residue was recrystallized from chloroform to give 7.91g (71%) of bis(2-fluoro-2,2-dinitroethyl)dichloroformal as colorless crystals, mp 57°–58° C.

H - NMR (CDCl$_3$/TMS) δ (ppm) - d, 5.02.

Calc. for C$_5$H$_4$Cl$_2$F$_2$N$_4$O$_{10}$: C, 15.44; H, 1.04; Cl, 18.23; F, 9.77; N, 14.40

Found: C, 15.46; H, 1.05; Cl, 18.40; F, 9.98; N, 14.11.

Example 2

Bis(2-fluoro-2,2-dinitroethyl)dichloroformal

Gaseous chlorine was slowly passed into a stirred slurry of 21.0 g (0.067 mol) of bis(2-fluoro-2,2dinitroethyl)thionocarbonate in 100 ml of dry carbon tetrachloride and 10 ml of dry trifluoroethanol for 4.5 hours at the end of this period the slurry had changed into a clear orange-colored solution. After standing overnight, volatiles were removed on a rotovac and the solid residue was recrystallized from chloroform to give 19.33 g (83%) of bis(2-fluoro-2,2-dinitroethyl)dichloroformal, m.p. 57°–8° C.

The bis(2-fluoro-2,2-dinitroethyl)thiocarbonate used in examples 1 and 2 can be prepared according to the method disclosed in example 1 of U.S. Pat. No. 4,172,088, entitled "Bis(2-Fluoro-2,2-dinitroethyl)thionocarbonate and a method. of Preparation," which issued on Oct. 23, 1979, to Angres et al.

Example 3

To a three-necked, round bottomed flask equipped with a nitrogen inlet, a motor driven stirrer, and an insulated spiral condenser outlet which was cooled at −30° C. were added 2,2,8,8-tetranitro-4,6-dioxanonane-1,9-diol (DINOL, 20.0 g, 0.0581 mol), bis(2-fluoro-2,2-dinitroethyl)dichloroformal (19.31 g, 0.0496 mol) and 1,2-dichloroethane (13.0 mL). A preheated 75° C. oil bath was raised around the flask causing the contents to form a solution quickly. A rapid, steady stream of nitrogen was passed through the solution via a sintered glass sparge tube throughout the course of the reaction. After six days, 98.24% of the calculated amount of hydrogen chloride had been trapped by an aqueous sodium hydroxide solution (0.1 N). A white solid was isolated by evaporation of the solvent under vacuum and allowing the foam thus formed to solidify. The hydroxyl equivalent weight corrected for the extent of reaction was 1785, measured from the decrease in the infrared absorption of toluenesulfonylisocyanate. The number average molecular weight calculated from the reactant ratio corrected for the extent of reaction was 3792. Thus, the functionality was 2.12.

Example 4

The prepolymer produced in example 3 (4.00 g) dissolved in bis(2-fluoro-2,2-dinitroethyl)formal (FEFO, 4.84 g) was degassed under vacuum overnight at 60° C. Isophorone diisocyanate (0.17 g), N,N',N"-trisisocyanatohexylbiuret (0.13 g), and dibutyltin dilaurate (0,004 g) were added. The solution was degassed under vacuum for 20 minutes and cured at 60° C for four days to form a clear elastic gumstock.

Example 5

2,2,8,8-tetranitro-4,6-dioxanonane-1,9-diol (60.0 g, 0.174 mol), bis(2-fluoro-2,2-dinitroethyl)dichloroformal (54.25 g, 0,139 mol), and ethanol-free chloroform (51.0 mL) were added to a three-necked, round bottomed flask equipped with a nitrogen sparge tube inlet, an insulated, spiral condenser outlet at −25° C., and a motor driven stirrer. A preheated 60°–65° C. oil bath was raised around the flask causing the contents to form a solution quickly. A rapid, steady 6 stream of nitrogen was passed through the solution throughout the course of the reaction. After 25 hours, 81% of the calculated amount of hydrogen chloride had been trapped in an aqueous sodium hydroxide (0.1 N) solution. The supernatant liquid was decanted from the cooled mixture. The residue in the flask was extracted with stirring two times with 2% methanol-chloroform and two times with 100% chloroform. The remaining solvent was removed in vacuo, and the solid foam was powdered. Yield: 69.85 g (66.93% overall yield, 95.92% based on the extent of reaction). The hydroxyl equivalent weight of the material, corrected for the presence of some (~5–8%) nonfunctional cyclic orthocarbonate, was 998.3 g/eq. OH. Analysis by gel permeation chromatography gave the following corrected values: weight average molecular weight of 2830, number average molecular weight of 2121, and dispersity of 1.33. Thus, the average functionality of the chains above 1000 molecular weight is 2.12.

Example 6

The prepolymer prepared in example 5 (4.00 g) and dibutyltin dilaurate (0.04 g), dissolved in bis(2-fluoro-2,2-dinitroethyl)formal (5.55 g) were degassed under vacuum for two hours at 55° C. Toluene diisocyanate (0.27 g) and an aromatic polyfunctional isocyanate (trade name: PAPI 135, Upjohn Co., 0,095 g) were added. The solution was degassed under vacuum at 55° C. for four hours and cured at ambient pressure at 55° C. for seven days with a few bubbles showing up after two days to form an elastic gumstock.

Example 7

DEGREE OF REACTION UNDER DIFFERENT CONDITIONS

| | REACTION CONDITIONS | | RESULTS |
|---|---|---|---|
| Run | Solvent* | Temperature | Time (hrs.) |
| 1 | No solvent | 80–85° C. | 24 | crosslinked material |
| 2 | 20% FEFO** | 80° C. | 25 | crosslinked material |
| 3 | 30% to 50% FEFO | 75° C. | 48 | incomplete reaction |
| 4. | 29% CH$_2$ClCH$_2$Cl | 75° C. | 144 | complete reaction |
| 5. | 26% CH$_3$NO$_2$ | 75° C. | 60 | complete reaction |
| 6. | 26% CH$_3$NO$_2$ | 85° C. | 36 | complete reaction |
| 7. | 1,2-dimethoxy-ethane, gamma-butyrolactone BF$_3$·Et$_2$0 | | | incomplete reaction |
| 8. | 26% CH$_3$NO$_2$ | 70° C. | 72 | 94% complete reaction |
| 9. | 26% CHCH$_2$CHCH$_2$ | 70° C. | 72 | 95% complete reaction |
| 10. | 26% CHCH$_2$CHCH$_2$ + Dinol | 70° C. | 39 | complete reaction |
| 11. | 24% CHCL$_3$ | 65° C. | 24 | 67% complete reaction |

*Weight percentage of solvent based on the total weight of the solvent plus reactants
**FEFO is bis(2-fluoro-2,2-dinitroethyl) formal.

Example 8

Properties of Bis(2-fluoro-2,2-dinitroethyl)dichloroformal/dinol prepolymer

Appearance: White Powder

Melting Range: 60–100° C.

Vacuum Thermal Stability (120° C., 48 H): 1.01 cc/g

Density: 1.67 g/mL

Heat of Formation: −603.8 cal/g

Calculated Detonation Pressure (Kamlet-Jacobs): 258 Kbar

Electrostatic Senisivity: ) >12.5 joules

Sliding Friction: >980 ft-lbs

Obviously, many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. An energetic hydroxy-terminated poly(2-fluoro-2,2-dinitroethyl) polynitroorthocarbonate prepolymer of the formula

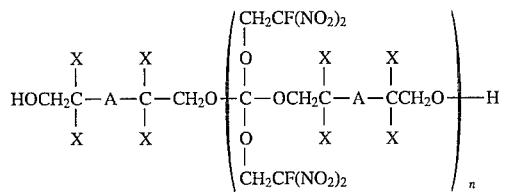

wherein n>1, X is selected from the group consisting of F and $NO_2$, and wherein when X is F, -A- is selected from the group consisting of —$CF_2$—, —$CF_2CF_2$—, —$CF_2CF_2CF_2$—, and —$CF_2CF_2CF_2CF_2$—, but when X is $NO_2$, -A- is selected from the group consisting of —$CH_2CH_2$—, —$CH_2OCH_2$—, and —$CH_2OCH_2OCH_2$—.

2. An energetic hydroxy-terminated poly(2-fluoro-2,2dinitroethyl) polynitroorthocarbonate prepolymer according to claim 1 which has an average molecular weight of from 1,000 to 10,000.

3. An energetic hydroxy-terminated poly(2-fluoro-2,2dinitroethyl) polynitroorthocarbonate prepolymer according to claim 1 wherein X is F and -A- is selected from the group consisting of —$CF_2$—, —$CF_2CF_2$—, —$CF_2CF_2CF_2$—, and —$CF_2CF_2CF_2CF_2$—.

4. An energetic hydro-terminated poly(2-fluoro-2,2dinitroethyl) polynitroorthocarbonate prepolymer according to claim 3 wherein -A- is selected from the group consisting of —$CF_2$—and —$CF_2CF_2$—.

5. An energetic hydroxy-terminated poly(2-fluoro-2,2dinitroethyl) polynitroorthocarbonate prepolymer according to claim 1 wherein X is $NO_2$ and -A- is selected from the group consisting of —$CH_2CH_2$—, —$CH_2OCH_2$—, and —$CH_{20}CH_2OCH_2$—.

6. An energetic hydroxy-terminated poly(2-fluoro-2,2dinitroethyl) polynitroorthocarbonate prepolymer according to claim 22 wherein X is $NO_2$ and -A- is —$CH_2OCH_2OCH_2$—.

* * * * *